United States Patent [19]

Chang

[11] Patent Number: 5,015,049

[45] Date of Patent: May 14, 1991

[54] METHOD OF FORMING HOLOGRAPHIC OPTICAL ELEMENTS FREE OF SECONDARY FRINGES

[75] Inventor: Byung J. Chang, Ann Arbor, Mich.

[73] Assignee: Kaiser Optical Systems, Ann Arbor, Mich.

[21] Appl. No.: 277,466

[22] Filed: Nov. 23, 1988

Related U.S. Application Data

[63] Continuation of Ser. No. 927,341, Nov. 4, 1986, abandoned, which is a continuation of Ser. No. 613,901, May 24, 1984, abandoned.

[51] Int. Cl.⁵ .............................................. G03H 1/04
[52] U.S. Cl. ..................................... 350/3.81; 350/3.6
[58] Field of Search ....................... 350/3.85, 3.6, 3.67, 350/3.68, 3.7, 3.8, 3.81

[56] References Cited

U.S. PATENT DOCUMENTS

| | | | |
|---|---|---|---|
| 3,506,327 | 4/1970 | Leith et al. | 350/3.5 |
| 3,558,207 | 1/1971 | Worthington, Jr. | 350/3.5 |
| 3,633,407 | 1/1972 | Whitman | 350/3.5 X |
| 3,640,559 | 2/1972 | van Ligten | 350/3.5 |
| 3,659,914 | 5/1972 | Brooks | 350/3.5 |
| 3,677,616 | 7/1972 | Lewis | 350/3.5 |
| 3,737,212 | 6/1973 | Antonson et al. | 350/3.5 X |
| 3,754,814 | 8/1973 | Leith | 350/162.5 F |
| 3,779,652 | 12/1973 | Lang | 350/3.5 |
| 3,819,248 | 6/1974 | Takeda et al. | 350/3.5 |
| 3,832,026 | 8/1974 | Mottier | 350/3.5 |
| 3,848,096 | 11/1974 | Marko | 350/3.5 X |
| 3,867,009 | 2/1975 | Pawluczyk | 350/3.5 |
| 3,919,881 | 11/1975 | Metherell | 350/3.5 X |
| 3,954,322 | 5/1976 | Aleksoff et al. | 350/3.5 |
| 4,155,630 | 5/1979 | Ih | 350/3.67 X |
| 4,218,111 | 8/1980 | Wirthrington et al. | 350/3.72 |
| 4,261,647 | 4/1981 | Ellis | 350/174 |
| 4,456,382 | 6/1984 | Arns et al. | 350/3.6 |
| 4,458,977 | 7/1984 | Arns et al. | 350/3.6 |
| 4,458,978 | 7/1984 | Arns et al. | 350/3.67 |
| 4,582,389 | 4/1986 | Wood et al. | 350/3.65 |

OTHER PUBLICATIONS

Born et al., *Principles of Optics*, Pergamon Press, Fourth Ed. 1970, N.Y., 1970, pp. 316-322.

Stone, J. M., *Radiation and Optics*, McGraw-Hill, N.Y., 1963, pp. 294-312.

Siebert, L. D., "Holographic Coherence Length of a Pulse Laser", *Applied Optics*, vol. 10, No. 3, Mar. 1971, pp. 632-637.

"Holography with Achromatic-Fringe Systems", by E. N. Leith and J. Upatnieks, *Journal of the Optical Society of America*, vol. 57, No. 8, pp. 975-980, Aug. 1967.

(List continued on next page.)

Primary Examiner—Bruce Y. Arnold
Assistant Examiner—David R. Parsons
Attorney, Agent, or Firm—Krass & Young

[57] ABSTRACT

Holographic optical elements relatively free of unwanted, secondary fringes are produced by passing the light beam from a laser through a rotating diffusing plate to generate a beam of light having a very limited coherence length and a spatial coherence which changes over a period of time. A photographic emulsion having a mirror supported on its reverse side is illuminated by the beam and interference occurs between this primary illumination and illumination reflected from the mirror, creating fringes. No other interference fringes are formed because of the lack of coherence between secondary reflections and other rays of the incident beam. The rotation of the diffusion plate time averages out speckle patterns which would otherwise occur.

Alternatively, the illuminating beam has a high degree of spatial coherence but its temporal coherence is reduced and varied over a period of time by changing the wavelength of a tunable-dye laser.

6 Claims, 5 Drawing Sheets

OTHER PUBLICATIONS

"Space Invariant Holography with Quasi-Coherent Light", by E. N. Leith and B. J. Chang, *Applied Optics*, vol. 12, pp. 1957 to 1962, Aug. 1973.

"Holography with Non-Coherent Light", by Byung Jin Chang, *Optics Communications*, vol. 9, No. 4, pp. 357–359, Dec. 1973.

"Space-Invariant Multiple-Grating Interometers in Holography", by B. J. Chang, E. N. Leith, *Journal of the Optical Society of America*, vol. 69, No. 5, pp. 689–696, May 1979.

"Imaging Technique Using Spatially and Temporarily Modulated Wave Front", by Sasaki et al., *Applied Optics*, Oct. 1, 1980, vol. 19, No. 19.

"Interferometric Construction of Circular Gratings", by E. Leith, H. Chen, G. Collins, K. Scholten, G. Swanson and J. Upatnieks, *Applied Optics*, vol. 19, No. 21, pp. 3626–3630, Nov. 1, 1980.

"Grating Generation with an Encoded Extended Incoherent Source", by T. H. Chao and F. T. S. Yu, *Optics Letters*, vol. 7, No. 6, pp. 251–252, Jun. 1982.

"Interferometric Recording of High-Quality Zone Plates in Spatially Incoherent Illumination", by G. J. Swanson, *Optics Letters*, vol. 8, No. 1, pp. 45–47, Jan. 1983.

"Construction and Evaluation of HOEs Made in Light of Reduced Coherence", by Emmett N. Leith and Stach Leon, *Applied Optics*, vol. 23, No. 6, pp. 942–947, Mar. 15, 1984.

METHOD OF FORMING HOLOGRAPHIC OPTICAL ELEMENTS FREE OF SECONDARY FRINGES

This is a continuation of U.S. Pat. application Ser. No. 927,341, filed Nov. 4, 1986, now abandoned, which is a continuation of U.S. Pat. application Ser. No. 613,901, filed May 24, 1984, now abandoned.

BACKGROUND OF THE INVENTION

1. Field of the Invention

This invention relates to holographic optical elements and methods of forming such elements in such a manner as to make them free of unwanted secondary fringes by use of light beams having short coherence path lengths.

2. Prior Art

Holographic optical elements (HOEs) comprise plates having fine fringe-like structures which are formed by photographic processes involving the recording of interference fringe patterns of two mutually coherent light beams. In use, the fringe-like structures diffract light wavefronts incident on the HOEs to act as lenses, filters and the like.

When HOEs are formed by illuminating a photographic emulsion coated on a supporting plate with a pair of coherent light beams to form an interference pattern, it is difficult to prevent various secondary reflections of the incident light beam from interfering to produce unwanted, secondary fringe patterns of a lower intensity than the primary fringes. One source of these secondary reflections is the reflection that occurs when the primary interfering beam, after having passed through the photographic emulsion, enters the immediately contacting media, be it air, a liquid or solid material. Despite the fact that the contacting media is transparent, because of the differences in indices of refraction between the emulsion and this media, some reflections back into the emulsion will occur from the interfaces. These reflections can be minimized using index-matching techniques and anti-reflection coatings, but cannot be completely eliminated. If the primary light beam has sufficient coherence path length, these reflections back into the emulsion will interfere with the primary beam to produce secondary fringes. In many applications of HOEs, the resulting weak, secondary fringe systems will not deleteriously affect the performance of the device, but in certain applications such secondary fringes are highly undesirable. For example, holographic optical elements are used as combiners in head-up display systems in which they act to superimpose instrument displays on the pilot's view through the aircraft windshield. In this application secondary fringe systems may produce undesirable images to the pilot which may interfere with his perception of both the instrument displays and the view through the windshield.

SUMMARY OF THE INVENTION

The present invention is accordingly directed toward a method of forming HOEs in such a manner as to achieve a desired fringe pattern without the generation of any undesirable secondary fringes.

The present invention preferably achieves this object by producing an HOE from the interference of two light beams having an extremely limited coherence path length so that they will form extremely localized fringe patterns but their secondary reflections will be incoherent with one another and with the primary incident beams so that no stationary interference or resulting fringes will be produced within the photographic emulsion.

The limited coherence beams used in the present invention have a high degree of either spatial or temporal coherence and a low degree of the other coherence. Thus, when the path length between the two beams is shorter than the coherence path length of the light source, the beams will produce higher contrast stationary fringes at their intersection. If the path lengths between the primary beams and their reflections are longer than the coherence path length, secondary fringe patterns cannot be produced because the secondary reflections become incoherent with respect to the primary beams. The two beam sections are arranged so that they intersect one another, within the media, in the very short coherence path length of the beams. Any reflections produced by the beams as they exit the media will be incoherent with respect to other sections of the primary incident beams and accordingly, will not produce secondary fringes when they intersect such beams.

The limited coherence beam of the present invention may be produced by passing light from a laser having a high degree of both temporal and spatial coherence through a random phase (diffusing) plate which lowers the spatial coherence of the beam but does not appreciably reduce the temporal coherence. If the phase plate is stationary during the time of the exposure, stationary interference patterns would occur at random locations between various sections of the beam which illuminate the media, producing what is termed a speckle pattern. This possibility is eliminated by moving the random phase plate during the exposure time so that any random interferences are time-averaged to zero, eliminating the speckle pattern.

Alternatively, the beam could be produced with low temporal coherence and high spatial coherence by tuning the spectrum of a tunable-dye-laser over the period of the exposure.

One technique for obtaining localized interference in the photographic emulsion with a limited coherence light beam, involves backing up the photographic emulsion with a mirror and illuminating the emulsion with a single limited coherence beam. The mirror is in close contact to the emulsion and its reflections are highly coherent with the incident beam and strongly interfere with them. The single beam illumination technique using a mirror has been employed in the prior art to form white light holograms using beams that are both spatially and temporally coherent.

BRIEF DESCRIPTION OF THE DRAWINGS

Other objectives, advantages and applications of the present invention will be made apparent by the following detailed description of two alternative embodiments of the invention. The description makes reference to the accompanying which.

DETAILED DESCRIPTION

Figure 1:
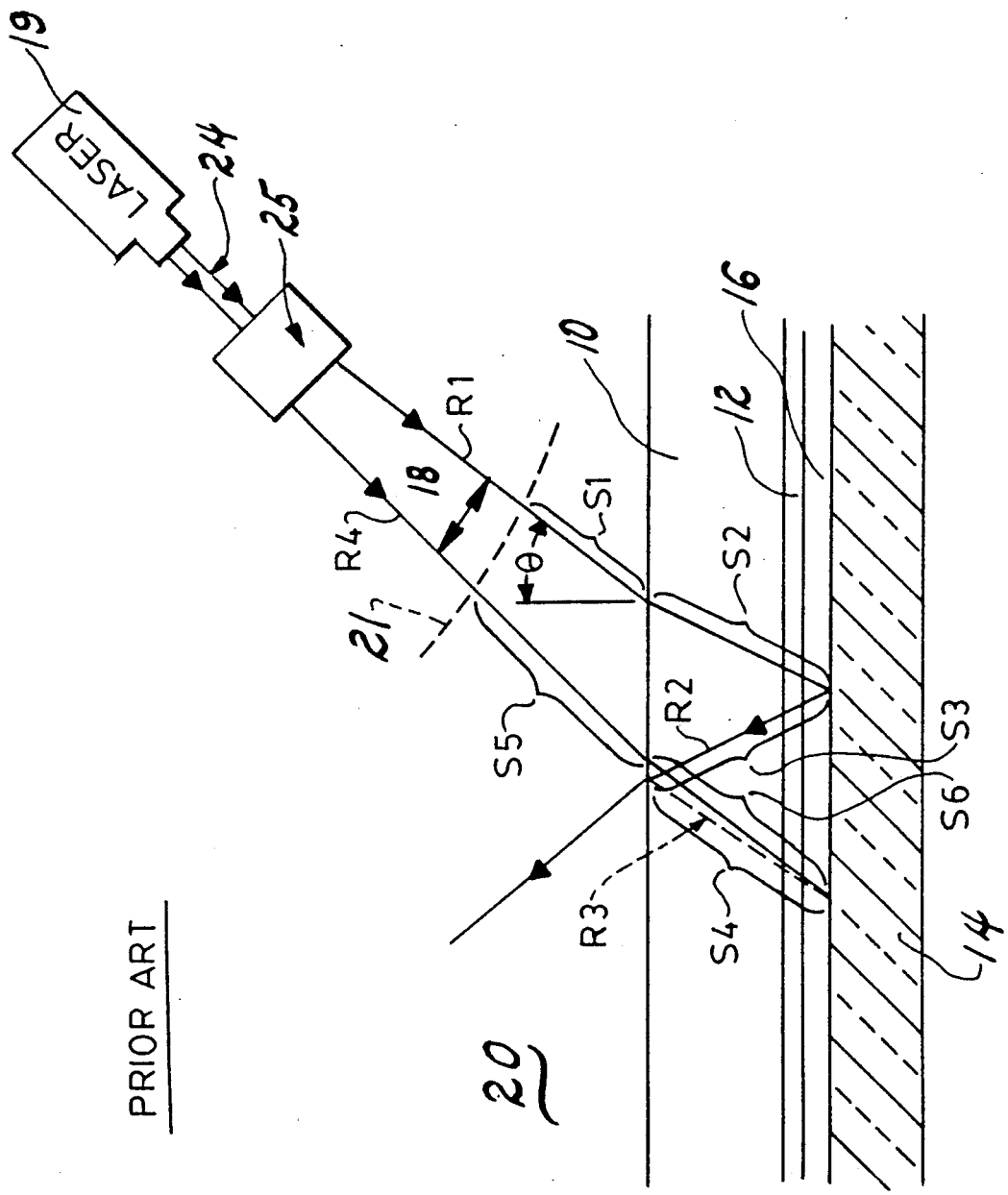
FIG. 1 is a diagrammatic illustration of the interference patterns which occur when a photographic emulsion layer, backed by a mirror, is illuminated with coherent light.

FIG. 1 diagrammatically illustrates the manner in which undesired secondary fringe patterns are generated in the prior art method of forming a reflection HOE using a single coherent beam technique.

A glass plate 10 is coated with a photosensitive layer 12 of the type used to form holograms, preferably a photographic emulsion. Alternatively other photosensitive materials such as thermoplastics or photoresists may be used. A planar mirror 14 is placed with its reflective surface in close proximity to the emulsion layer 12 by an index matching medium 16.

The glass plate 10 is illuminated by a beam 18 of coherent light, derived from a laser 19 and a beam forming optical system 25, which is incident on the plate. One ray R1 of the beam 18 will be incident on the glass plate 10, at an angle of $\theta$ to the normal of the photosensitive emulsion 12 and, the index matching medium 16 and will be reflected by the mirror surface 14 back through the layers at a complementary angle of $\theta$ to the normal in the form of a ray R2. As the wavefront of the ray R2 passes through the emulsion 12 in a direction opposite to the wavefronts of R1, stationary interference patterns will occur which are substantially constant over the period of the exposure. The difference in path length between these two beams is very short, typically on the order of 30 microns to several centimeters. The stationary pattern of constructive and destructive interference between these two beams produces latent images in the photosensitive emulsion in the form of a fringe pattern. Upon subsequent photographic development of the emulsion, a fringe pattern of varying optical transmissivity as refractive index is produced.

As the reflected ray R2 passes through the interface between the glass plate 10 and the ambient media 20, typically air, a reflected ray R3 is produced because of the difference between the indices of refraction of the two medias. Anti-reflective coatings may be used to minimize the reflection but inevitably some reflection will occur. This secondarily reflected ray R3 will move in the same direction as another section of the primary incident ray R4, and as both move through the emulsion layer 12 a stationary pattern of interference will occur if the difference in path lengths that the two wavefronts travel through to reach this point is within the coherence length of the incident laser beam 18. Measuring from a common wave front point 21 on the two incident beam rays R1 and R4, the difference dp in the path length between the secondary reflected ray R3 and the ray R4 will be approximately $S_1+S_2+S_3+S_4-S_5-S_6$. If this difference is sufficiently greater than the coherence path length of the laser, no stationary interference fringes will be produced. If this difference is not greater than the coherence path length of the laser, secondary interference fringes will be formed. In any event, the interference fringes produced between this secondarily reflected beam and the primary beam will be weaker in amplitude than the fringes produced by the primary beam's interference with its own reflection from the mirror 14, but these weak secondary fringes may deleteriously affect the performance of the resulting HOE.

Figure 2:
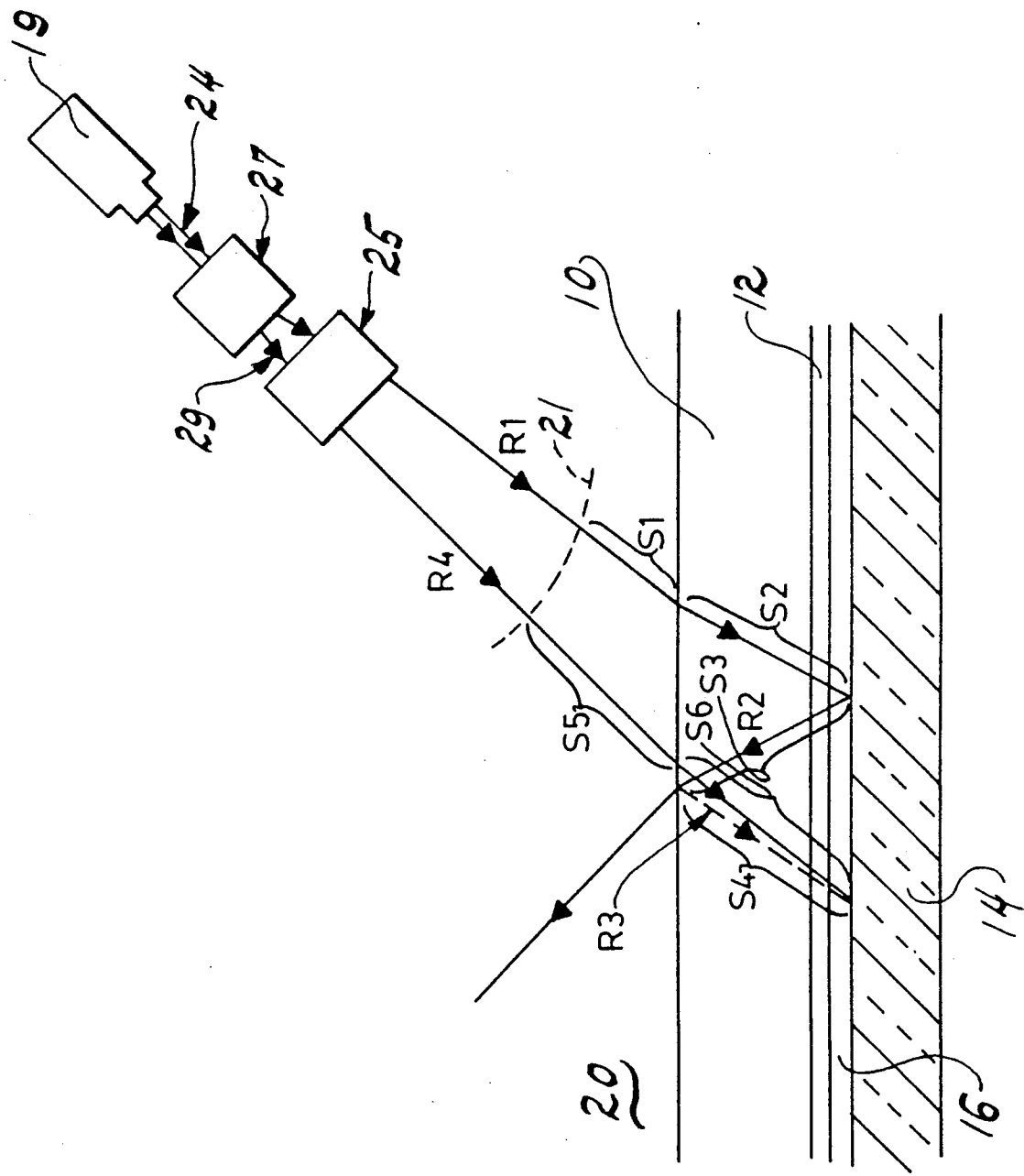
FIG. 2 is a diagrammatic illustration of a first method of practice of the present invention wherein a single beam of light of limited spatial coherence illuminates a photographic emulsion layer backed by a mirror to form a reflection HOE.

A preferred embodiment of the present invention used to form reflection HOEs with a single beam technique is diagrammatically illustrated in FIG. 2. A laser light 24 generated by laser 19 is passed through a coherence control device 27 so that the output beam 29 from the coherence control device which is subsequently passed through beam forming optical system 25, will have a coherence path length L much shorter than the beam path length difference dp ($=S_1+S_2+S_3+S_4-S_5-S_6$). In this case, since the path length difference dp is much longer than the coherence length L of the beam there are not stationary fringe patterns formed between the secondary reflective ray R3 and the primary ray R4. In practice of the method illustrated in FIG. 2, proper balance should be achieved between the path length difference dp and the coherence path length L of the light source so that a high contrast primary interference pattern is formed but no secondary interference occurs.

Figure 3:
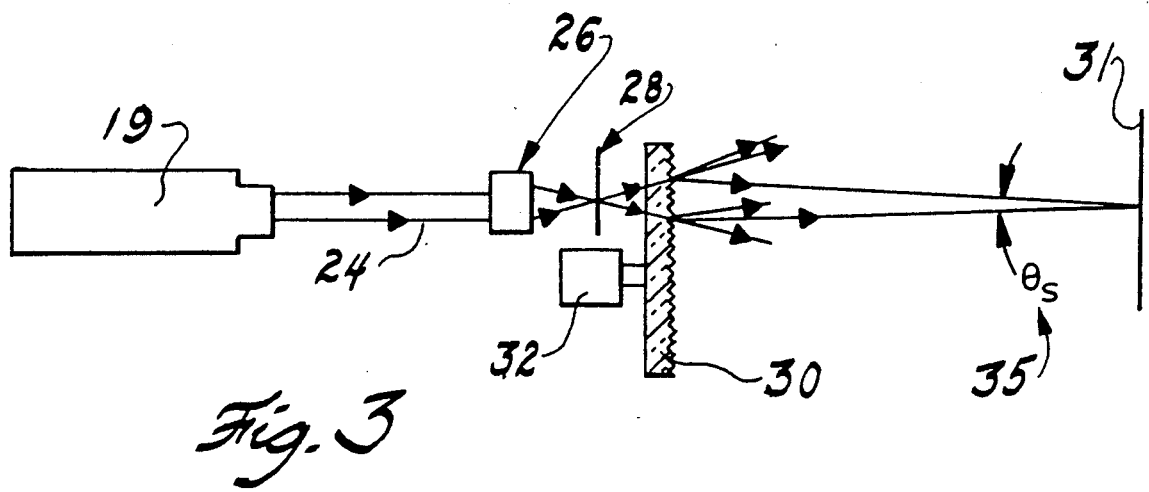
FIG. 3 is a schematic illustration of a first form of spatial coherence control device for use with the present invention, comprising a rotating random phase plate.

A preferred embodiment of the spatial coherence control device 27 is diagrammatically illustrated in FIG. 3. A beam 24 from the laser 19 is passed through beam shaping optics 26 such as a microscope objective to focus the beam at a plane 28. A circular random phase disk 30 of etched or ground glass is rotated in its plane by a motor 32 so that the beam intersects the plate beyond the focal plane 28, thus illuminating an area on the disk. In alternative embodiments the phase plate could be moved randomly or reciprocated linearly. Because of the variations in the thickness of the rotating, random phase plate, the rays of the beam passing through different points of the phase plate will have different phases. Moreover, because of the rotation of the phase plate 30, the phases of any two points on the exiting beam will vary relative to one another during the period of the exposure. Accordingly, the spatial coherence of the beam that exits the rotating random phase plate will be reduced.

In this manner the coherence length L of the exiting beam will be decreasing at an angular source size $\theta_s$ 35, which is observed as the recording plane 31, increases. The coherence path length of the beam is approximately in an inverse relationship to the angular source size $\theta_s$ 35.

Figure 4:
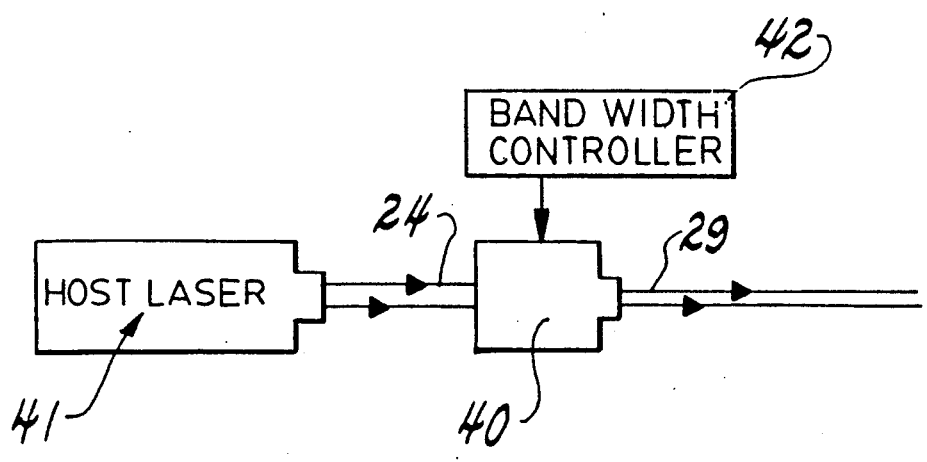
FIG. 4 is a schematic diagram of a form of a temporal coherence control device for use with the present invention, comprising a tunable-dye laser.

A preferred embodiment of the temporal coherence control device is diagrammatically illustrated in FIG. 4. A host laser 41 providing its output to a tunable-dye laser 40 is operative to generate a collimated output beam 24. A suitable tunable-dye laser is Coherent Radiation Corporation, Model CR599-01. Using a coumarin-7 dye, the output of the laser may be varied between 505 and 565 nanometers. A bandwidth controller 42 is connected to the laser to vary its output during the period of the exposure. The nature of the bandwidth controller depends upon the specific tunable-dye laser being used and may constitute a drive motor which varies the position of the cavity mirror during the period of the exposure or alternatively may simply provide a varying electrical signal which changes the output of the laser.

The coherence length L of the laser beam is inversely proportional to the spectral bandwidth of the laser and if the spectral bandwidth of a fixed output laser is sufficiently broad it may be unnecessary to change the tuning of the laser during the exposure time and accordingly the need for a tunable-dye laser is eliminated.

The output beam 29 of the temporal coherence control of FIG. 4 is used in the manner illustrated in FIG. 2 to form an HOE without secondary fringes.

Figure 5:
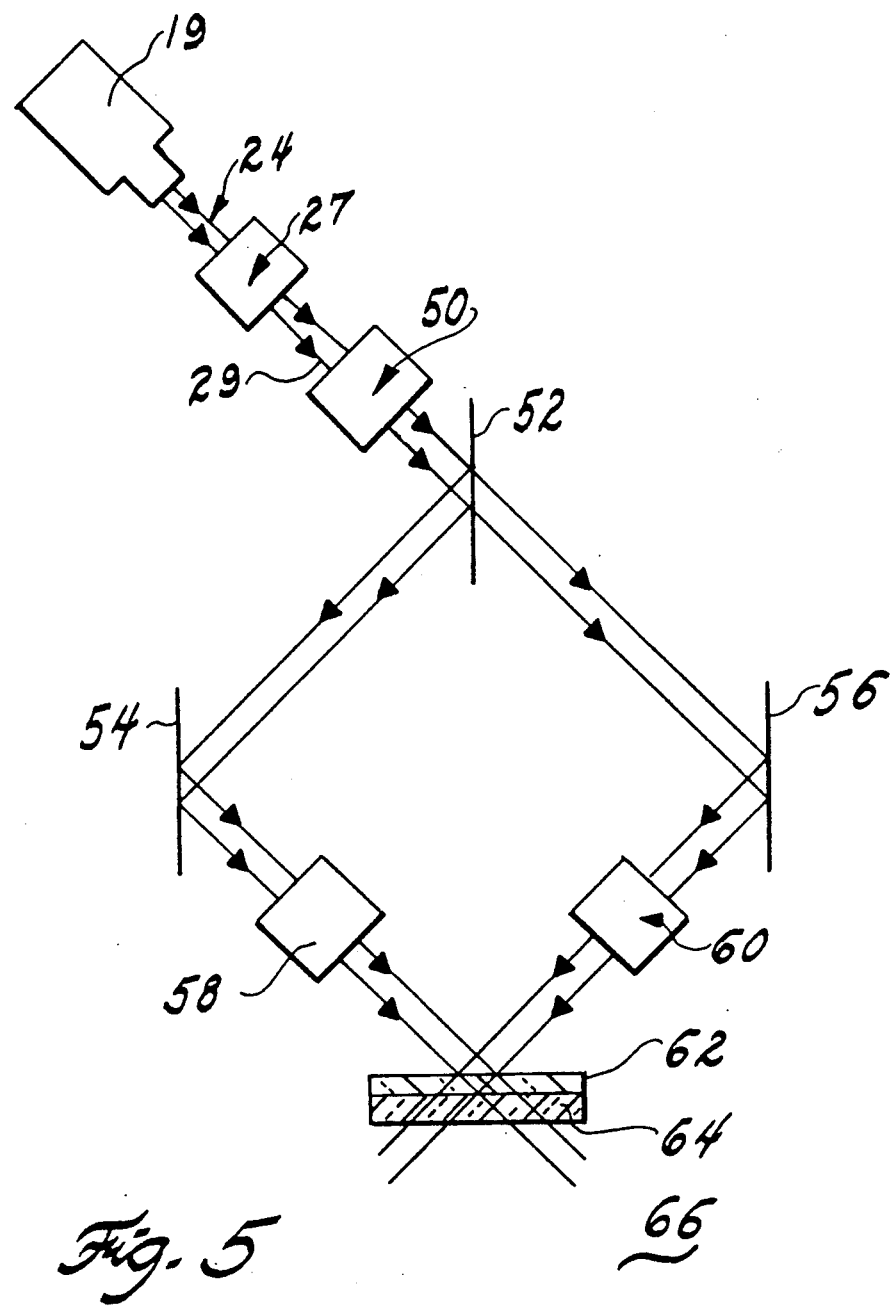
FIG. 5 is a schematic diagram of a method for practice of the present invention using two beams to form a transmission hologram.

FIG. 5 illustrates the manner in which a limited coherence beam, such as the type produced by the systems of FIGS. 3 or 4, is used to form a transmission HOE. The output beam from a laser 19 is passed through a spacial or temporal coherence control device 27 to produce a limited coherence output beam 29 with coherence length L. A beam forming optical system 50, such as a microscope objective, pinhole, or the like provides a collimated output beam which is incident upon a beam splitter 52. One beam section is reflected by a mirror 54 through another suitable beam forming optical system 58 and the output beam is incident upon a photosensitive emulsion 62 formed on a substrate 64.

The other beam from the splitter 52 is reflected by a mirror 56 through a beam forming optical system 60 and the output beam is incident upon the emulsion 62 at an angle relative to the first beam. The path lengths of the two beams from the beam splitter to the substrate are carefully controlled so as to be substantially identical. Accordingly, when the two beams intersect within the emulsion stationary interference patterns are formed during the period of the exposure despite variations in the input beam that may be produced by the coherence control unit 27. Reflections which occur when the incident beams reach the interface between the substrate 64 and the ambient media 66 are relatively incoherent with respect to the primary incident beams so that no stationary fringe patterns are formed when they intersect with these beams within the emulsion.

The photosensitive emulsion is then developed by suitable means to provide the desired HOE.

Figure 6:
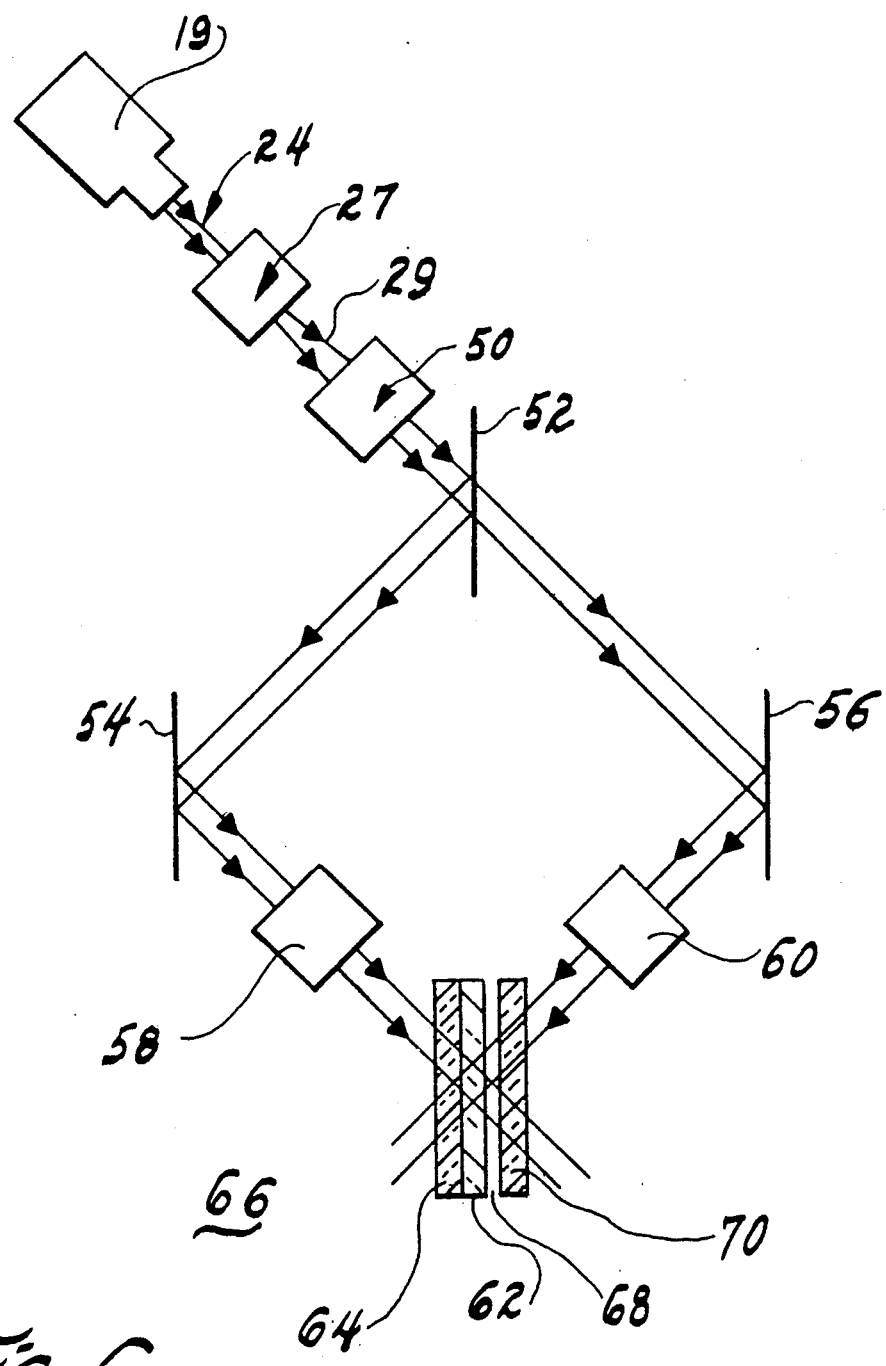
FIG. 6 is a schematic diagram of a method of the practice of the present invention using two beams to form a reflection hologram.

FIG. 6 illustrates essentially the same apparatus used to form a reflection HOE. The emulsion 62 and supporting substrate are supported relative to the two limited coherence beams, of equal path length, so that the beams enter the emulsion from opposite sides. A cover plate 70 of substantially the same constitution as the substrate 64 matches the path length of the two beams to compensate for the refraction that occurs by passage of one of the beams through the substrate 64. A index matching medium 68 interfaces the abutting surface of the cover plate 68 and the emulsion 62.

I claim

1. The method of constructing a reflection holographic optical element free of secondary interference fringes comprising:
    forming a planar transparent supporting substrate having a predetermined thickness and first and second surfaces;
    disposing a layer of transparent photosensitive material on said second surface of said transparent supporting substrate, said layer of photosensitive material having a first surface in contact with said second surface of said transparent supporting substrate and a second surface;
    forming a first light beam from a polychromatic point source having a predetermined spectral bandwidth, said predetermined spectral bandwidth forming an effective coherence length inversely proportional thereto;
    illuminating said transparent supporting substrate and said layer of photosensitive material through said first surface of said transparent supporting substrate with said first light beam;
    reflecting said first light beam after it passes through said layer of photosensitive material from a reflecting surface disposed in immediate proximity to said second surface of said layer of photosensitive material, thereby forming a second light beam which passes through said layer of photosensitive material and said transparent supporting substrate; and
    developing said layer of photosensitive material;
    whereby said predetermined spectral bandwidth of said first beam is selected having an effective coherence length greater than the distance along the light path from said first surface of said photosensitive material to said reflecting surface and reflected to said first surface of said photosensitive material such that the intersection of said first light beam and said second light beam forms interference fringes of high contrast throughout said layer of photosensitive material and said predetermined spectral bandwidth of said first light beam is selected having an effective coherence length less than the distance along the light path from said second surface of said photosensitive material to said reflecting surface, reflected to said first surface of said supporting substrate and further reflected to said second surface of said photosensitive material such that the intersection of said first light beam and a third light beam formed by the reflection of said second light beam from said first surface of said transparent supporting substrate caused by the difference in index of refraction between said transparent supporting substrate and the ambient media beyond said first surface of said transparent supporting substrate does not form interference fringes of high contrast anywhere within said layer of photosensitive material.

2. The method o constructing a reflection holographic optical element as claimed in claim 1 wherein:
    said step of forming said first light beam consists of generating light from a tunable-dye laser having a wavelength change during said step of illuminating for producing said predetermined spectal bandwidth.

3. The method of constructing a reflection holographic optical element as claimed in claim 1, wherein:
    said step of reflecting said first light beam consists of disposing a reflecting surface in close proximity to said second surface of said layer of photosensitive material and filling the space between said layer of photosensitive material and said reflecting surface with an index matching fluid having an index of refraction substantially equal to the index of refraction of said layer of photosensitive material.

4. The method of constructing a reflection holographic optical element free of secondary interference fringes comprising:
    forming a planar transparent supporting substrate having a predetermined thickness and first and second surface;
    disposing a layer of photosensitive material on said second surface of said transparent supporting substrate, said layer of photosensitive material having a first surface in contact with said second surface of said transparent supporting substrate and a second surface;

forming a first light beam from a monochromatic point source;

forming a second light beam from said first light beam by forming an extended source of independently radiating elements having a predetermined angular source size from said first light beam, said predetermined angular source size forming an effective coherence length inversely proportional thereto;

illuminating said transparent supporting substrate and said layer of photosensitive material through said first surface of said transparent supporting substrate with said second light beam at a predetermined illuminating angle;

reflecting said second light beam after it passes through said layer of photosensitive material from a reflecting surface disposed in immediate proximity to said second surface of said layer of photosensitive material, thereby forming a second light beam which passes through said layer of photosensitive material and said transparent supporting substrate; and developing said layer of photosensitive material;

whereby said predetermined angular source size of extended source of independently radiating points of said second light beam is selected with respect to said predetermined illuminating angle having an effective coherence length greater than the distance along the light path from said first surface of said photosensitive material to said reflecting surface and reflected to said first surface of said photosensitive material such that the intersection of said second light beam and said third light beam forms interference fringes of high contrast throughout said layer of photosensitive material and is selected with respect to said predetermined illuminating angle having an effective coherence length less than the distance along the light path from said second surface of said photosensitive material to said reflecting surface, reflected to said first surface of said supporting substrate and further reflected to said second surface of said photosensitive material such that the intersection of said second light beam and a fourth light beam formed by the reflection of said third light beam from said first surface of said transparent supporting substrate caused by the difference in index of refraction between said transparent supporting substrate and the ambient media beyond said first surface of said transparent supporting substrate does not form interference fringes of high contrast anywhere within said layer of photosensitive material.

5. The method of constructing a reflection holographic optical element as claimed in claim 4, wherein:

said step of forming a second light beam from said first light beam consists of illuminating a first surface of a diffuser plate with diverging light from said monochromatic point source producing said predetermined angular source size at a second surface of said diffuser plate, said predetermined angular source size determined by the distance between said monochromatic point source and said first surface of said diffuser plate, and moving said diffuser plate thereby forming said extended source of independently radiating elements.

6. The method of constructing a reflection holographic optical element as claimed in claim 4, wherein:

said step of reflecting said second light beam consists of disposing a reflecting surface in close proximity to said second surface of said layer of photosensitive material and filling the space between said layer of photosensitive material and said reflecting surface with an index matching fluid having an index of refraction substantially equal to the index of refraction of said layer of photosensitive material.

* * * * *

UNITED STATES PATENT AND TRADEMARK OFFICE
CERTIFICATE OF CORRECTION

PATENT NO. : 5,015,049

DATED : May 14, 1991

INVENTOR(S) : Byung J. Chang

It is certified that error appears in the above-identified patent and that said Letters Patent is hereby corrected as shown below:

On the Title Page and in column 1:

In the title "Method of Forming Holographic Optical Elements Free of Secondary Fringes" should be --Single Beam Method for Forming Reflection Holographic Optical Elements Free of Secondary Fringes--;

Column 6, line 43, "o" should be --of--.

Signed and Sealed this

Fourth Day of October, 1994

Attest:

BRUCE LEHMAN

*Attesting Officer*  *Commissioner of Patents and Trademarks*